May 24, 1949.                E. F. LA BAT                2,470,934
                              POTATO SLICER
                          Filed Sept. 25, 1946
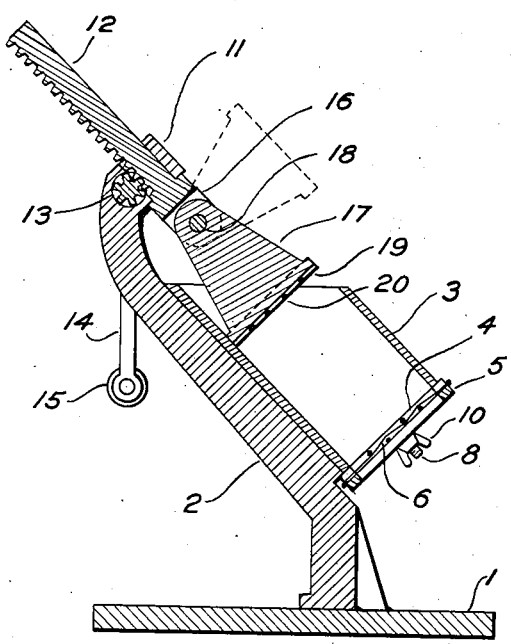
Fig. 1.
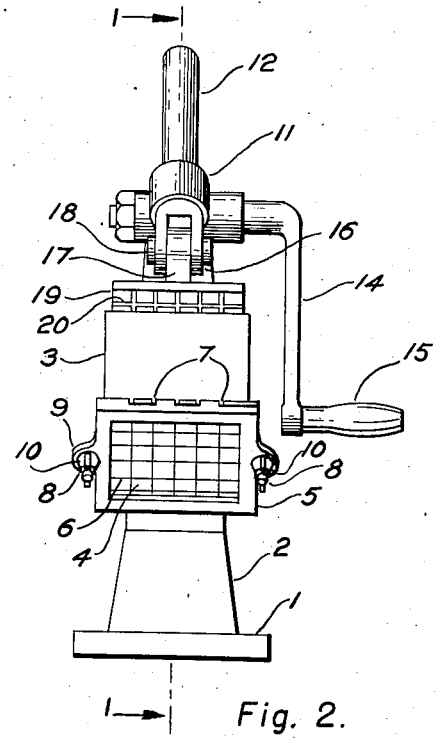
Fig. 2.
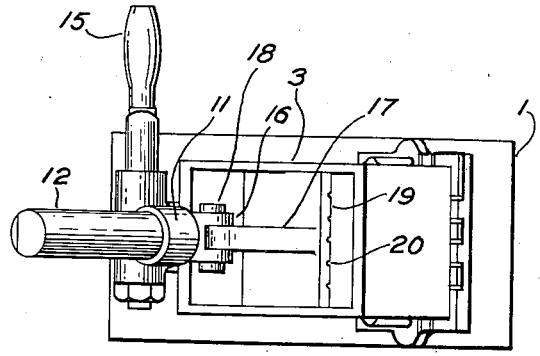
Fig. 3.
Fig. 4.
INVENTOR.
Edward F. La Bat
BY
Harry C. Schroeder Patented May 24, 1949

2,470,934

UNITED STATES PATENT OFFICE 2,470,934

POTATO SLICER

Edward F. La Bat, San Pablo, Calif.

Application September 25, 1946, Serial No. 699,132

2 Claims. (Cl. 146—169)

1

This invention relates to a device for mechanically cutting potatoes into strips to form "shoe string" or similar shapes for frying.

The main object is to provide a portable device for the purpose, suitable for home or general kitchen use, by means of which a potato may be quickly and easily converted into strips of predetermined cross sectional form and size.

In the drawings:

Figure 1 is a sectional elevation of the device on line 1—1 of Figure 2.

Figure 2 is a front view of the device.

Figure 3 is a top plan view of the same.

Figure 4 is a face view of the cutting unit, detached.

Referring to the numerals of reference on the drawing, the device comprises a flat base 1, which supports a standard 2, mainly disposed at an upward slope to its upper end. Fixed on top of the standard at the same slope is an initially open ended container 3, of rectangular cross section and of sufficient size to receive an average potato.

The lower end of the container is fitted with a cutting unit 4, which comprises a rectangular frame 5, on which is a network of cutting wires 6, arranged in crossing relation to each other to form a grill having the desired potato cutting pattern. The wires are located against lateral deflection by slots 7, in the frame and are held taut by suitable means.

The frame is removably mounted on the lower end of the container by a pair of studs 8, projecting from the sides thereof, and through ears 9, on the frame 5. Wing nuts 10, on the studs hold the frame against the container.

Standard 2, below the container clears the same so that a receptacle may be placed on the base for the potato strips as they are cut.

The standard above the container is formed as an upstanding boss 11, which slidably supports a rack bar 12, for movement lengthwise and substantially centrally of container 3. The rack is engaged by a pinion 13, mounted in connection with a crank 14, journaled in the boss transversely of the rack and provided on one end with a suitable handle 15. The lower end of the rack bar is formed with a clevis 16, in which a bracket 17, is pivoted by a transverse pin 18. The lower end of the bracket carries a pressure plate 19, of a size to slidably fit container 3, and normally resting on the bottom thereof. The plate, which is parallel to the cutting unit, is provided on its working face with grooves 20, to match the pattern of wires 6, and register therewith. The sides and top of the container are cut back so that when the rack is fully retracted the pressure plate may be swung up out of the way, as shown in dotted lines in Figure 1, leaving space between the plate and container for the entry of a potato to be cut into the container.

The pressure plate is then swung down into

2 place and upon rotation of the crank handle 15, the rack and pressure plate are advanced in the container. This pushes the potato ahead of the plate, causing the same to press against and be cut into strips by the wires 6. When the pressure plate reaches the cutting unit, the wires 6, are received in grooves 20, thus assuring the complete cutting and extrusion of the potato to its very end.

I claim:

1. A potato cutter comprising a standard having an upwardly sloping position an initially open-ended container mounted on said sloping position parallel thereto and with its lower end hanging clear, a cutting grill over said lower end of the container, the bottom wall of the container at its upper end extending further than the top wall, a pressure plate normally resting on the bottom wall for movement lengthwise into the container, a rack bar slidably guided in the standard back of the plate, means pivoting the plate on the adjacent end of the bar for upward swinging movement of the latter when retracted clear of the top wall of the container, and means to advance and retract the rack bar and plate.

2. A potato cutter comprising a base, a standard carried thereby and having an upwardly sloping portion; a container mounted on the standard and having its lower end hanging clear off the same; a cutting grill over said lower end; said container having its upper end cut substantially parallel to the base so that the bottom wall extends farther than the upper wall; a pressure plate normally resting on the bottom plate beyond the upper wall; a rack bar slidably guided by the standard for advancing and retracting the pressure plate; means pivoting the plate on the adjacent end of the rack bar for upward swinging out of the upper end of the container when retracted clear to the top wall of the container, and means for retracting and advancing the rack bar and the plate.

EDWARD F. LA BAT.

REFERENCES CITED

The following references are of record in the file of this patent:

UNITED STATES PATENTS

| Number | Name | Date |
| --- | --- | --- |
| 1,320,294 | Todd | Oct. 28, 1919 |
| 1,478,684 | Taylor et al. | Dec. 25, 1923 |
| 1,805,376 | Samson | May 12, 1931 |
| 2,046,396 | Matter | July 7, 1936 |
| 2,283,029 | Bakewell | May 12, 1942 |

FOREIGN PATENTS

| Number | Country | Date |
| --- | --- | --- |
| 454,835 | Germany | Jan. 19, 1928 |
| 700,819 | France | Jan. 2, 1931 |